(12) United States Patent
Bender (10) Patent No.: US 7,275,730 B2
(45) Date of Patent: Oct. 2, 2007

(54) HEIGHT-ADJUSTING DEVICE AND SUPPORT FOR OPTICAL SYSTEMS, WHICH COMPRISES HEIGHT-ADJUSTING DEVICES

(75) Inventor: Claus Bender, Asslar-Werdorf (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 6 days.

(21) Appl. No.: 10/550,962

(22) PCT Filed: Mar. 2, 2004

(86) PCT No.: PCT/EP2004/050233

§ 371 (c)(1),
(2), (4) Date: Feb. 14, 2006

(87) PCT Pub. No.: WO2004/085908

PCT Pub. Date: Oct. 7, 2004

(65) Prior Publication Data

US 2006/0186287 A1    Aug. 24, 2006

(30) Foreign Application Priority Data

Mar. 26, 2003   (DE) .............................. 103 13 656

(51) Int. Cl.
*A47B 91/00*    (2006.01)

(52) U.S. Cl. .............................. 248/346.05; 248/118.3; 248/188.4; 248/188.5; 359/368

(58) Field of Classification Search ............ 248/346.1, 248/346.05, 346.06, 678, 118.3, 118, 188.2, 248/188.4, 188.5, 188.8; 359/390, 368
See application file for complete search history.

(56) References Cited

U.S. PATENT DOCUMENTS

| 1,103,206 A | 7/1914 | Howe |
| 2,730,923 A | 1/1956 | Gorham et al. |
| 4,605,188 A | 8/1986 | Goetz |
| 4,780,571 A | 10/1988 | Huang |

(Continued)

FOREIGN PATENT DOCUMENTS

DE          3100595        7/1982

(Continued)

*Primary Examiner*—Ramon O Ramirez
(74) *Attorney, Agent, or Firm*—Simpson & Simpson, PLLC (57) ABSTRACT

A device for adjusting the height of an arrangement 2 relative to a mounting surface 3 is disclosed. Height-adjusting device 1 is designed so that during height adjustment no friction takes place as a result of rotation of the contact sites of the height-adjusting devices 1 with the mounting surface 3. Height-adjusting device 1 consists of a rotary wheel 8, a socket 9 and a foot 11. The height adjustment of rotary wheel 8 and foot 11 relative to the stationary socket 9 occurs in telescopic manner. Height-adjusting device 1 is designed so that the foot 11 undergoes a displacement twice as large as does rotary wheel 8. A support (30) for an optical system is provided with several height-adjusting devices 1 connected with the bottom 5 of a base 31 of the support 30. On the support 30 there are provided a left and a right hand rest 31a and 31b which are fastened to the base 31 of the support 30 by means of a hinge 32 so that independently of the height adjustment of the support 30, the edges 32a of the left or right hand rest located opposite the hinge always rest on the mounting surface 3.

28 Claims, 8 Drawing Sheets

U.S. PATENT DOCUMENTS

| | | | |
|---|---|---|---|
| 5,116,004 A | 5/1992 | Luecke | |
| 5,195,705 A * | 3/1993 | Kline et al. | 248/118.3 |
| 5,383,632 A * | 1/1995 | Shirlin et al. | 248/118.5 |
| 5,517,354 A | 5/1996 | Mika | |
| 5,915,655 A * | 6/1999 | Gutowski | 248/118.5 |
| 6,135,401 A | 10/2000 | Chen | |
| 6,717,724 B2 * | 4/2004 | Mitzkus et al. | 359/368 |
| 7,136,222 B2 * | 11/2006 | Reichert et al. | 359/368 |

FOREIGN PATENT DOCUMENTS

| | | |
|---|---|---|
| DE | 19533934 | 12/1996 |
| DE | 19747080 | 11/1998 |
| DE | 10030773 | 2/2002 |
| DE | 10148781 | 10/2002 |
| FR | 867029 | 9/1941 |

* cited by examiner

HEIGHT-ADJUSTING DEVICE AND SUPPORT FOR OPTICAL SYSTEMS, WHICH COMPRISES HEIGHT-ADJUSTING DEVICES

CROSS REFERENCE TO RELATED APPLICATIONS

This application claims priority of the German patent application 103 13 656.8, filed Mar. 26, 2003, and the International application PCT/EP2004/050233, filed Mar. 2, 2004, which are incorporated by reference herein.

FIELD OF THE INVENTION

The invention relates to a device for height adjustment. In particular, the invention relates to a device for adjusting the height of an arrangement relative to a mounting surface wherein the device is connected to the base of the arrangement. The device consists of at least two movable elements that can be displaced relative to one another in telescopic manner. Firmly connected with the base is a socket surrounded on all sides by a rotary wheel. The rotary wheel also surrounds a foot. On the rotary wheel there are provided a first and a second thread with complementary inclinations. The socket cooperates with the first thread on the rotary wheel and the foot with the second thread on the rotary wheel.

Moreover, the invention relates to a support for optical systems with devices for height adjustment. In particular, the invention relates to a support for an optical system provided with at least three height-adjusting devices connected with the bottom of the base of the support. The term "connected" means that the optical system is detachably connected with the support. Furthermore, the optical system can be designed so that the support is integrated with the optical system. The support is provided with a left and a right hand rest, the left and right hand rest being fastened to the base by means of a hinge. Moreover, the base is connected with the bottom of the optical system. Each device for height adjustment comprises a socket which on all sides is surrounded by a rotary wheel, said rotary wheel also surrounding the foot. On the rotary wheel there are provided a first and a second thread having complementary inclinations. The socket cooperates with the first thread on the rotary wheel and the foot cooperates with the second thread on the rotary wheel in a manner such that the height adjustment takes place without the foot undergoing a rotary movement.

BACKGROUND OF THE INVENTION

The optical systems that hitherto have been commercially available did not provide the possibility of height adjustment so that in this manner they could be adapted to the various ergonomic requirements of the various users. For optical systems used continuously by a user for eight hours daily or longer, it is essential that the user be able to make an ergonomic adjustment of the optical system including a certain height adjustment relative to the user.

German Patent 101 48 781 discloses a microscope support whereby the microscope can be brought into an ergonomic position for the user. A base plate with adjustable inclination serves simultaneously also as an arm rest. In the center of the base plate is provided a support plate for the microscope with which the arm or hand rests are also firmly connected. The height and the inclination of the microscope can be adjusted. Because the base plate is connected with the support plate, a large number of adjustment steps is needed to obtain the ergonomically most favorable position. In addition, the base plate requires a large floor surface which is detrimental when close-by instrument placement on laboratory tables is needed.

U.S. Pat. No. 5,517,354 discloses an ergonomically adjustable support plate for a microscope. The microscope is firmly mounted on this support plate. To adjust the inclination of the support plate, at least one thread bottom is needed. Hand rests for the user are not provided so that for a height-adjusted microscope, the user must assume an extremely unfavorable hand position. In addition, when the inclination is adjusted, the thread bottom rotates on the support requiring an increased force for the adjustment.

U.S. Pat. No. 2,730,923 shows a microscope which together with the illumination system can be tilted to achieve an ergonomically favorable work position for the user. The microscope itself is fastened to a support plate. The fastening of the microscope to the support plate is achieved with knurled head-screws. In this case, the ergonomic work position can be attained only by tilting the entire microscope and the support disposed on the microscope. For many experiments, tilting the entire microscope is not suitable.

German Patent DE 195 33 934 C1 discloses a locking arrangement for telescope tubes of a height-adjustable stage that can be displaced in one another. To lock the displaceable telescope tubes, there is provided a manually actuated screw spindle which is guided in a thread part disposed on the other tube and which penetrates through the wall of the outer tube. At the end of the screw spindle is disposed an oscillating disk with a washer the large surface of which can be pushed into the wall of the inner tube. As a result, reliable locking of the two telescope tubes can be achieved. The arrangement, however, is not of a compact design.

German Patent DE 100 30 773 C2 discloses an arrangement for linear height adjustment. This arrangement comprises an upright profile with a displaceable telescope the profile of which relative to the upright profile is linearly guided exhibiting only minimal play, with a motor disposed in the telescope profile, with at least two drive gears disposed in the telescope profile and driven by the motor and with at least two concentric drive control guides with which the drive gears engage. Height adjustment by means of a motor is complicated and not well suited for simple and fast adjustment.

German Patent DE 197 47 080 C1 discloses an installation bottom support. The installation bottom support comprises a foot that is height-adjustable by rotation relative to a threaded sleeve. The metallic foot surrounds a thread cooperating with a spherical segment thus providing a height adjustment. The metallic foot is guided in a pedestal in which are present at least two parallel boreholes provided with threaded sleeves for the purpose of taking up the shaft of the foot. The installation bottom support has the drawback that during the adjustment which takes place by rotation, the spherical segments rub against the bottom so that an increased adjustment force is required.

BRIEF SUMMARY OF THE INVENTION

The object of the invention is to provide a height-adjusting device that is easy to operate, has a compact structure and allows easy and simple use.

This objective is reached by means of a height-adjusting device having the features defined in claim 1.

Another object of the invention is to provide a support for optical systems with devices for height adjustment whereby in simple and inexpensive manner the optical systems can be brought into a work position that is ergonomic for the user.

This objective is reached by means of a support having the features defined in claim 13.

The invention has the advantage that on current instruments the device for height adjustment is attached to an additional support which together are then height-adjusted to achieve an ergonomic work position for the user. In newly developed optical systems or optical instruments, for example microscopes, the device can be mounted or disposed directly in the foot of the instrument. The foot can be designed so that the socket of the foot is provided integrally and directly in the housing of the support or in the optical system. A separate socket container can then be omitted. When a separate support is used, the devices for height adjustment are designed so that the height can be adjusted to about double that of the support.

As stated hereinabove, the height-adjusting device is connected with the bottom of an arrangement that is to be adjusted in both height and inclination. The height-adjusting device consists of at least two movable elements that can be displaced relative to one another in telescopic manner. Firmly connected with the bottom of the arrangement is a socket surrounded on all sides by a rotary wheel. The rotary wheel also surrounds a foot. On the rotary wheel there are provided a first thread and a second thread which have complementary inclinations. The socket cooperates with the first thread on the rotary wheel, and the foot cooperates with the second thread on the rotary wheel. The first thread is right-handed and the second thread is left-handed. Naturally, the foot and the socket cooperating with the first or second thread of the rotary wheel are also provided with corresponding threads.

The socket is designed in the form of a pot comprising a cover and a cylindrical wall, the cover being fastened at the bottom of the arrangement. Moreover, the socket comprises a centrally disposed pin-shaped holding element. The pin-shaped holding element is surrounded by an intermediate sleeve containing two slits that face each other. The slits cooperate with corresponding pins firmly fastened to the foot. This prevents the foot from rotating relative to the pin-shaped holding element of the socket. Moreover, the holding element of the socket contains a slit in which is guided a pin that is firmly connected with the intermediate sleeve. This ensures that the intermediate sleeve cannot rotate relative to the pin-shaped holding element of the socket.

On the holding element is also provided a displacement stop which with the pin provided in the intermediate sleeve limits the displacement of the foot.

At least three devices are provided for the displacement of an arrangement so as to achieve a steady height adjustment of the arrangement or of the optical system. It is particularly advantageous if the devices for height adjustment are disposed at the corner points of a triangle. Moreover, on each rotary wheel there can be provided a toothed element that cooperates with the transmission element. The transmission element can be a toothed belt or a chain. It is particularly advantageous if at least two height-adjusting devices are coupled with the transmission element. The transmission element transmits the rotary movement of the rotary wheel of a height-adjusting device to the other rotary wheel of another height-adjusting device so that a simultaneous, uniform height adjustment of the two devices is achieved.

Another advantage of the invention is that it provides a support for an optical system provided with at least three height-adjusting devices. The height-adjusting devices can be fastened directly to the bottom of the optical system. As an alternative, the height-adjusting devices can be disposed in the base of a support for the optical system. The support for the optical system is provided with a left and a right hand rest, the left and the right hand rest being fastened to the base by means of a hinge. Each height-adjusting device has a socket surrounded on all sides by a rotary wheel. The rotary wheel also surrounds a foot. On the rotary wheel there are provided a first thread and a second thread having complementary inclinations. The socket cooperates with the first thread on the rotary wheel, and the foot cooperates with the second thread on the rotary wheel so that the height adjustment takes place without a rotary movement of the foot.

The support for the optical system consists of the base which in turn consists of the bottom and a surrounding wall. The contour of the bottom corresponds to the contour of the bottom of an optical system that is located on or is connected to the support. The surrounding wall has at least three recesses through which the rotary wheel partly penetrates. As a result, the height-adjusting device is not completely visible from the outside, and only the rotary wheel can be actuated to achieve a height adjustment of the optical system or of the support.

To actuate the rotary wheel, each rotary wheel is provided with a ribbing to obtain improved force transmission from the hand of the user to the rotary wheel. To persons skilled in the art it is evident that the ribbing which extends all around can also be in the form of a friction-enhancing rubber coating.

The height-adjusting devices are disposed on the base of the support at the corner points of an equilateral triangle. The two height-adjusting devices disposed at base of the equilateral triangle are connected to each other by a transmission element. In this manner, a synchronous displacement of said two height-adjusting devices is achieved. It is also conceivable that all height-adjusting devices disposed on the support are coupled by a transmission element.

The optical system disposed on the support is, for example, a microscope for which an ergonomic work position for the user is to be achieved with the aid of the height-adjusting devices and of the hand rests provided on the support or on the base of the support. Regardless of the adjusted height of the support, the user should be able to assume an ergonomic work position relative to the mechanical operation elements, for example the control knob.

Other advantageous features of the invention will become evident from the claims below.

BRIEF DESCRIPTION OF THE DRAWINGS

The drawings schematically represent the object of the invention which is described with reference to the following figures of which.

DETAILED DESCRIPTION OF THE INVENTION

Figures 1, 2:
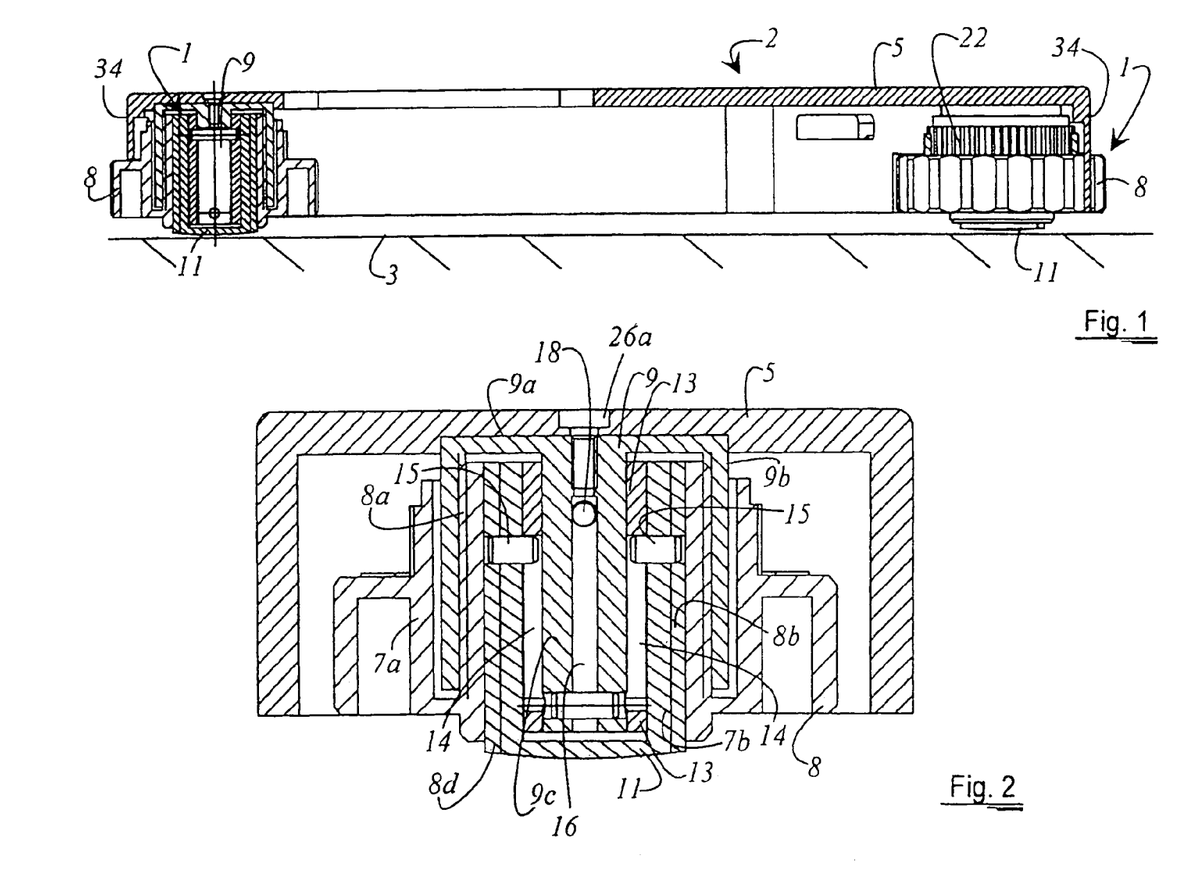
FIG. 1 is a side view of the support wherein the height-adjusting devices are not extended.
FIG. 2 is a detailed view of the height-adjusting device in cross section.

FIG. 1 shows a cross section of an arrangement 2 wherein there are disposed several height-adjusting devices 1. Arrangement 2 defines a housing open toward a mounting surface 3, the housing comprising a bottom 5 and a surrounding wall 34. Each height-adjusting device 1 comprises a foot 11 which is in contact with mounting surface 3. Height-adjusting device 1 is provided with a rotary wheel 8 whereby the height adjustment is achieved. To increase the friction between the user's hand and rotary wheel 8, each rotary wheel 8 is provided with a ribbing 38. Naturally, other means, for example a rubber coating, may be used to increase friction. Moreover, in the embodiment shown in FIG. 1 each of the rotary elements 8 is provided with a toothed element 22 cooperating with a transmission element 24 (see FIG. 8).

FIG. 2 shows a cross section of a device 1 wherein the height adjustment has not been made. Height-adjusting device 1 comprises a socket 9 comprising a cover 9a, a cylindrical wall 9b and a holding element 9c. Socket 9 is, for example, fastened to the bottom 5 of arrangement 2. The fastening can be accomplished, for example, with a common screw 26a or by gluing. Moreover, socket 9 can be made integral with the housing of a support or of an optical system. Socket 9 cooperates with a foot 11 and a rotary wheel 8. Socket 9, rotary wheel 8 and foot 11 are made, for example, of a plastic material by injection-molding. Rotary wheel 8 contains a first thread 8a and a second thread 8b. First thread 8a of rotary wheel 8 cooperates with socket 9 and the second thread 8b of rotary wheel 8 cooperates with foot 11. Although this is not specifically shown in FIG. 2, it will be evident to a person skilled in the art that socket 9 and foot 11 also have a corresponding thread. First thread 8a and second thread 8b have a mutually opposite inclination. First thread 8a is a right-handed thread and second thread 8b is left-handed. In the preferred embodiment, the inclination of the second thread 8b is twice as large as that of first thread 8a. Height-adjusting device 1 essentially consists of a first element 7a and a second element 7b that can be displaced relative to one another in telescopic manner. First element 7a is identical with rotary wheel 8 and second element 7b is identical with height-adjusting device 1. As previously stated, socket 9 is connected with bottom 5 of arrangement 2. Socket 9 has the shape of a pot, the pot comprising a cover 9a and a cylindrical wall 9b. The pin-shaped holding element 9c is disposed centrally on cover 9a. Pin-shaped element 9c is surrounded by an intermediate sleeve 13. In intermediate sleeve 13 are present two oppositely oriented slits 14. Into each slit 14 enters a pin 15 which is firmly connected with foot 11. In this manner, foot 11 is prevented from rotating relative to pin-shaped element 9c of socket 9. Pin-shaped holding element 9c has a slit 16 accommodating pin 18 which is firmly connected to intermediate sleeve 13. Pin 18 prevents intermediate sleeve 13 from rotating relative to pin-shaped holding element 9c. Pin-shaped holding element 9c is also provided with a displacement stop 20 which cooperates with pin 18 located in intermediate sleeve 13 and limits the height displacement of foot 11 (see FIG. 4).

Figure 3:
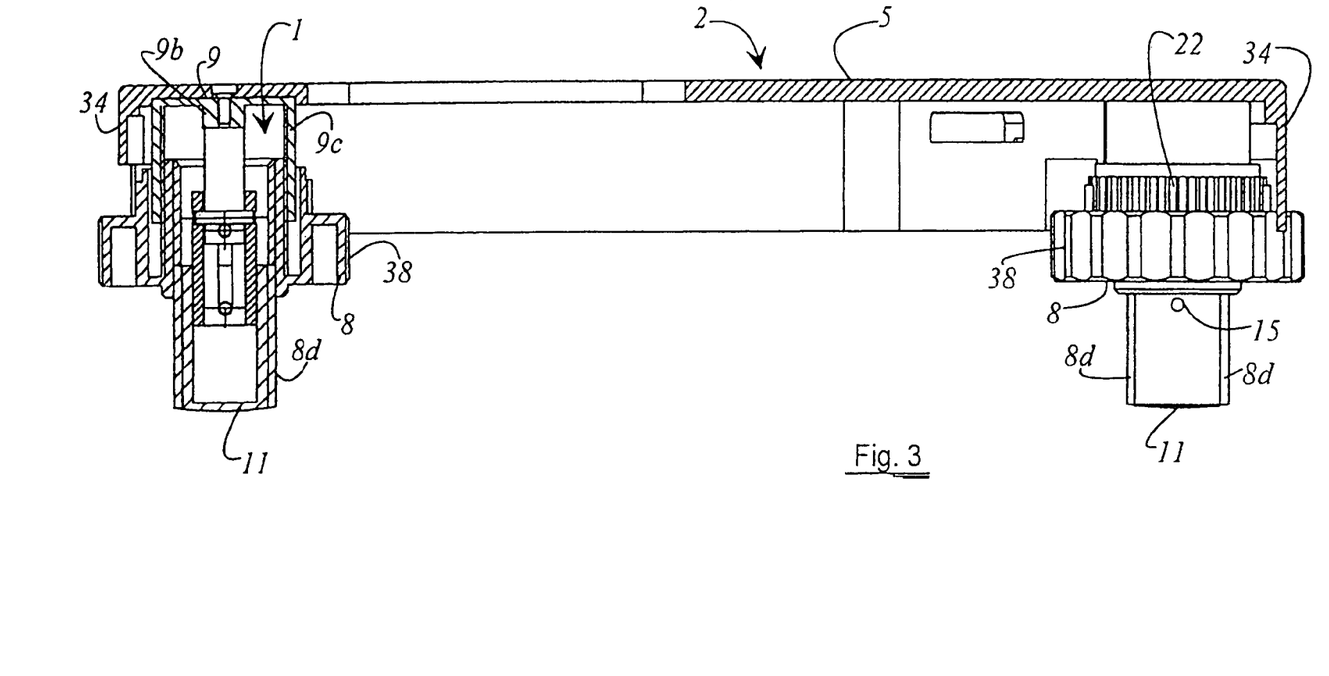
FIG. 3 is a side view of a support wherein the height-adjusting devices are extended so that the height of the support is adjusted.

FIG. 3 shows arrangement 2 wherein height-adjusting devices 1 have been displaced so that arrangement 2 is displaced in terms of height relative to mounting surface 3. By rotating rotary wheel 8, foot 11 is pushed out of arrangement 2 so that the distance of bottom 5 of arrangement 2 relative to mounting surface 3 increases. At the maximum height displacement achieved with height-adjusting device 1, foot 11 and rotary wheel 8 are pushed out of arrangement 2. Because the inclination of second thread 8b on rotary wheel 8 is double that of the first thread 8a on rotary wheel 8, the displacement of foot 11 cooperating with the second thread is twice as large. When foot 11 is fully extended, thread 8d disposed on it is fully visible. This, however, is only the case when foot 11 is provided with thread 8d over its entire length. In one embodiment, the foot is only partly provided with thread 8d so that at maximum displacement of the foot the user cannot see any thread on the foot.

This thread 8d logically has the same inclination as second thread 8b provided on rotary wheel 8. During the height adjustment, rotary wheel 8 itself is displaced away from bottom 5 of arrangement 2, said rotary wheel 8 protruding at least partially beyond surrounding wall 34. At maximum height adjustment, shown in FIG. 3, pin 15 which secures foot 11 against rotation relative to pin-shaped holding element 9c is visible.

Figure 4:
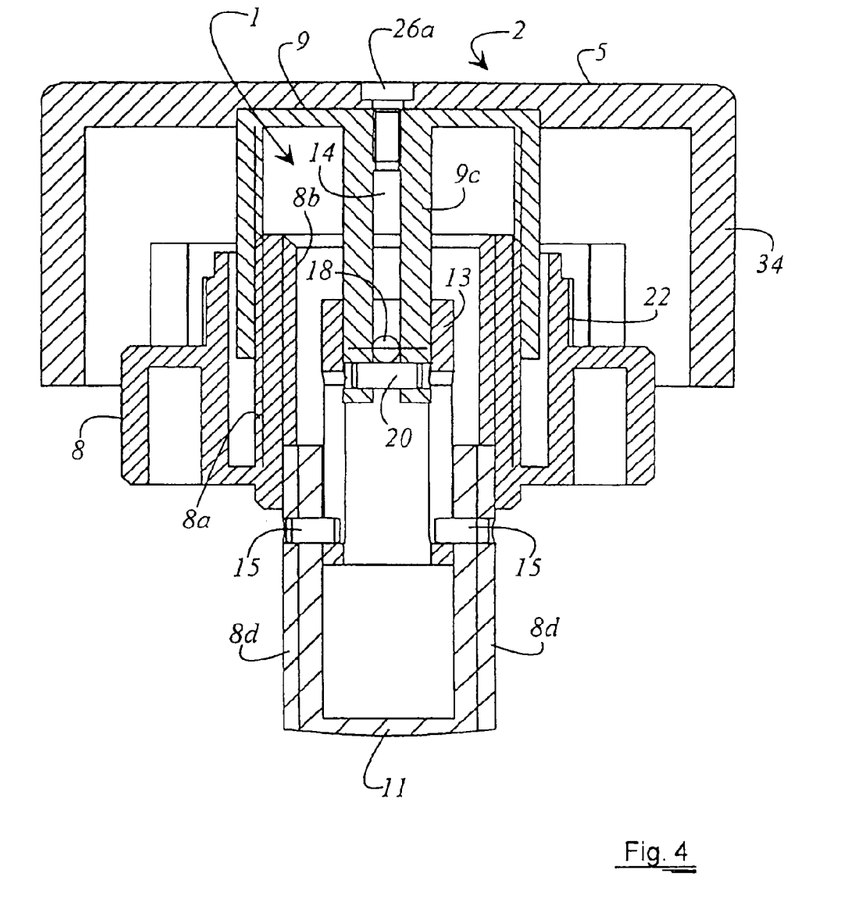
FIG. 4 is a detailed view of the height-adjusting device in cross section with the height adjustment already done.

FIG. 4 shows a cross-sectional representation of height-adjusting device 1 at its maximum height displacement. As already mentioned in the description of FIG. 3, at maximum height displacement both rotary wheel 8 and foot 11 extend out of arrangement 2. Under these conditions, rotary wheel 8 has covered one half the distance compared to foot 11. This is because the first thread 8a located in rotary wheel 8 has one-half the inclination compared to that of second thread 8b located in rotary wheel 8. During height adjustment, intermediate sleeve 13 finally slides along pin-shaped holding element 9c of socket 9. Pin-shaped holding element 9c has a slit 16 in which slides pin 18 the movement of which is limited by a displacement stop 20. Displacement stop 20 is provided at the lower end of pin-shaped holding element 9c and is firmly connected therewith. Also, in intermediate sleeve 13 there are present two slits 14 in each of which slides a pin 15 which is firmly connected with foot 11. In this manner, the foot is prevented from rotating during height adjustment. During maximum displacement, pins 15 are located at the lower end of the intermediate sleeve and thus also determine the maximum height displacement of height-adjust-ing device 1. During height adjustment, foot 11 is pushed out of height-adjusting device 1. Thread 8d which is provided on the foot and cooperates with second thread 8b on rotary wheel 8 now also becomes visible. Moreover, at maximum height displacement of height-adjusting device 1 the mounting points of pins 15 on foot 11 become visible. At maximum displacement, rotary wheel 8 protrudes from the surrounding wall, but part of rotary wheel 8 remains surrounded by surrounding wall 34 bearing toothed element 22.

Figure 5:
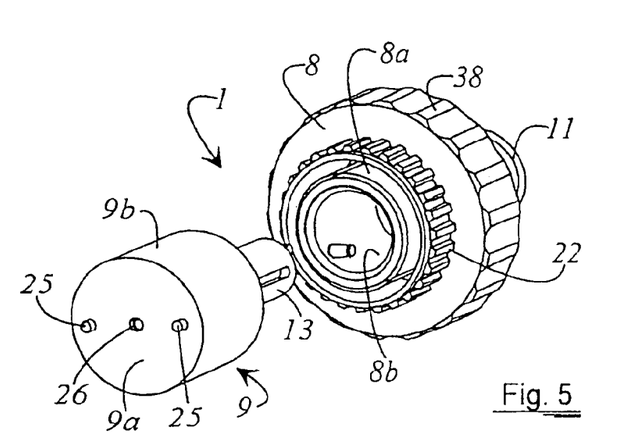
FIG. 5 is an exploded view of the height-adjusting device as seen from the bottom of the support.

FIG. 5 shows an exploded view in perspective of height-adjusting device 1 as seen from socket 9. As previously stated, socket 9 is pot-shaped and has a cover 9a which is surrounded by a cylindrical wall 9b. On cover 9a there are provided two knobs 25 and an orifice 26. Knobs 25 are used to align and prevent the rotation of socket 9 at bottom 5 of arrangement 2. A screw 26a for example, enters Into orifice 26 firmly fastening socket 9 to arrangement 2. It is conceivable for socket 9 to be glued to the bottom of arrangement 2. Socket 9 takes up intermediate element 13. Rotary wheel 8 consists of a single piece and is provided with ribbing 38 and toothed element 22 which is in contact with a transmission element. Inside rotary element 8 there are provided first thread 8a and second thread 8b.

Figure 6:
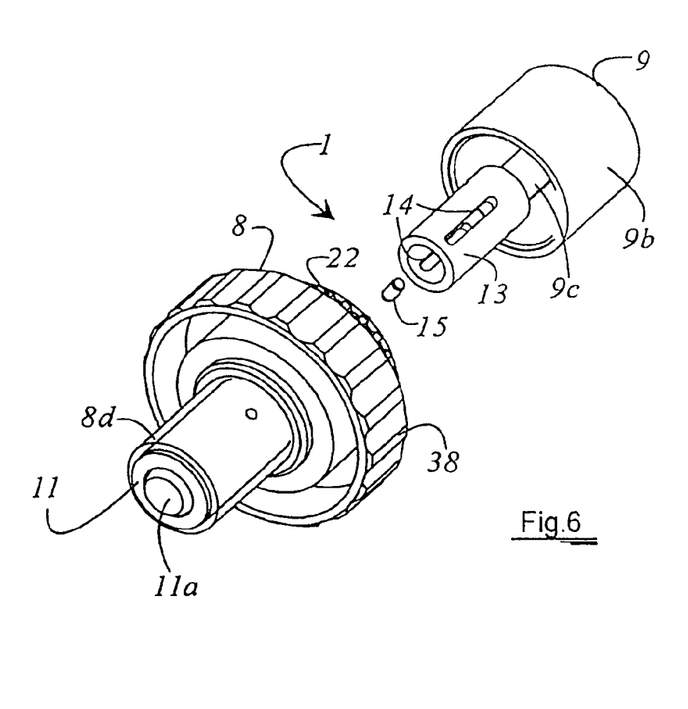
FIG. 6 is an exploded view of the height-adjusting device as seen from the foot of the device.

FIG. 6 shows an exploded view in perspective of height-adjusting device 1 as seen from foot 11. Inside pot-shaped socket 9 there is located pin-shaped holding element 9c. Socket 9 together with the pin-shaped holding element 9c and the surrounding cylindrical wall 9b also constitute a single piece. Pin-shaped holding element 9c is surrounded by intermediate sleeve 13 in which there are present two oppositely disposed slits 14 into which pin 15 engages and slides. Inter-mediate sleeve 13 also slides on pin-shaped holding element 9c. Foot 11 of the height-adjusting device protrudes from rotary wheel 8. Foot 11 is surrounded by a thread 8d which cooperates with a second thread 8b provided in rotary wheel 8.

Figure 7:
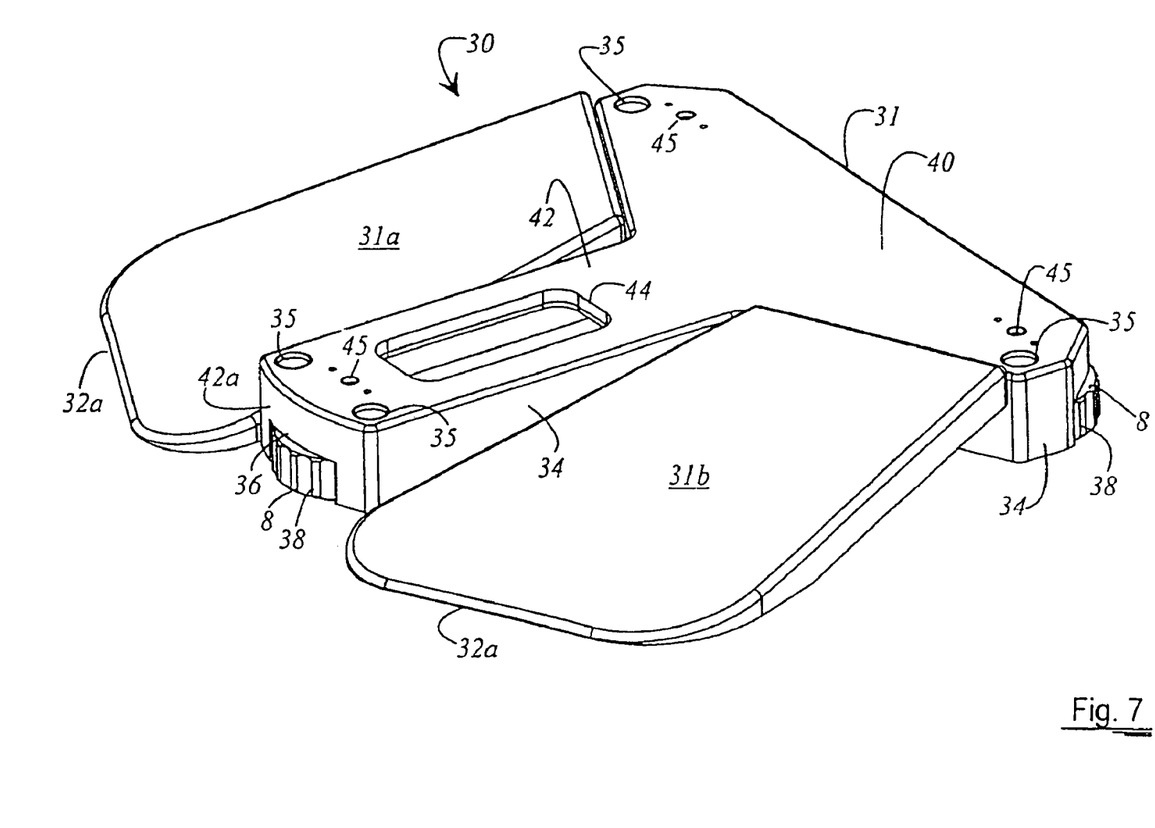
FIG. 7 is a perspective representation of the support for height adjustment in top view.

FIG. 7 shows a top view in perspective of a support 30 for an optical system. The support consists of a base 31 which in this embodiment has an essentially T-shaped structure. Height-adjusting devices 1 are connected with bottom 5 of base 31. Support 30 has a left and a right hand rest 31a and 31b. The hand rests are movably attached to base 31 by means of a hinge 32 (see FIG. 8). Base 31 has a surrounding wall 34 the height of which is such that for a support 30 that has not been height-adjusted rotary wheels 8 protrudes beyond surrounding wall 34. At each position in base 31 at which is located a height-adjusting device 1, however, there is provided a recess 36 through which protrudes ribbing 38 of rotary wheels 8. This allows the user to operate the rotary wheels. Base 31 has a surface 33 in which is provided at least one hollow 35 capable of receiving a corresponding foot of the optical system or of microscope 100. Furthermore, at surface 33 of base 31 is provided a recess 44 for ventilation of the optical system. Moreover, in base 31 there is provided at least one opening 45 for the purpose of fastening the optical system or microscope 100. Common screws can be used to fasten the optical system or microscope 100 to base 31. Persons skilled in the art may use other fastening means for this purpose.

Figure 8:
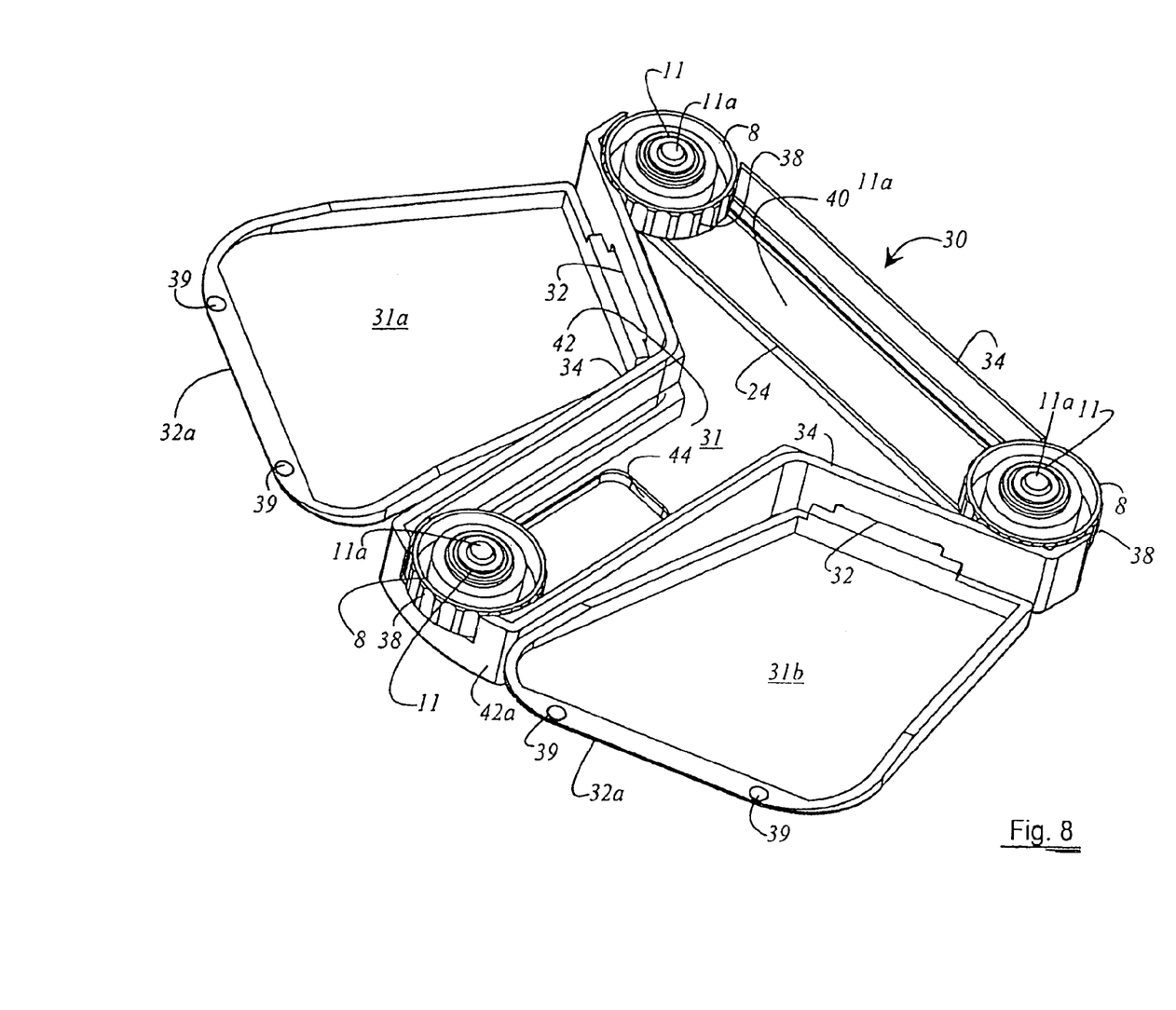
FIG. 8 is a bottom view of the support on which there are disposed three height-adjusting devices.

FIG. 8 shows a bottom view in perspective of support 13. As already stated in the description of FIG. 7, support 30 has a base which in this embodiment is essentially T-shaped. Bottom 5 of base 31 is surrounded all the way by wall 34. In the region of the height-adjusting devices, surrounding wall 34 has a recess 36 at each position of height-adjusting devices 1. Ribbing 38 provided on each rotary element 8 to actuate height-adjusting device 1 is reached via recess 36. On base 31 of support 30 are attached by means of hinge 32 a left and a right hand rest 31a and 31b. Hinge 32 makes it possible to place the left and right hand rest 31a and 31b on the mounting surface 3 independently of the height adjustment of the support. Opposite hinge 32 the right and left hand rest 31a and 31b are each provided with an edge 32a that lies on the mounting surface of support 30. On each edge 32a is located at least one small pad 39 to provide for softer contact of the first and second hand rest 31a and 31b with mounting surface 3. In the embodiment represented in FIG. 8, bottom 5 of base 31 is T-shaped. The T-shape consists of a cross-bar 40 to which is attached a vertical bar 42. The three height-adjusting devices 1 provided at bottom 5 of base 31 define an equilateral triangle. Two of the height-adjusting devices 1 are located in cross-bar 40 and the third height-adjusting device 1 is located at end 42a of bar 42 facing cross-bar 40. Height-adjusting devices 1 provided in cross-bar 40 are connected to each other by means of transmission element 24 which ensures uniform and even height adjustment of these two height-adjusting devices 1. Transmission element 24 can be a tooth belt or a chain and it cooperates with the toothed element provided on rotary wheel 8. It thus makes no difference to the user which of the two rotary wheels 8 of the height-adjusting devices 1 located in cross-bar 40 of base 31 he uses to achieve a height adjustment in the posterior region or in the region of cross-bar 40 of device 1. The height set by means of height-adjusting devices 1 can then be equalized with height-adjusting device 1 provided at the anterior end 42a of bar 42 thereby achieving a height adjustment of the optical system or microscope 100 parallel to mounting surface 3. It is also conceivable that for purposes of height adjustment all three height-adjusting devices 1 be connected to one another via a transmission element 24 so that when rotary wheel 8 of one height-adjusting device 1 is actuated a simultaneous and uniform displacement of the other two height-adjusting devices 1 is achieved. Foot 11 of each height-adjusting device 1 can be provided with a rubber element 11a to prevent slipping of support 2 on mounting surface 3 (see FIG. 6).

Figure 9:
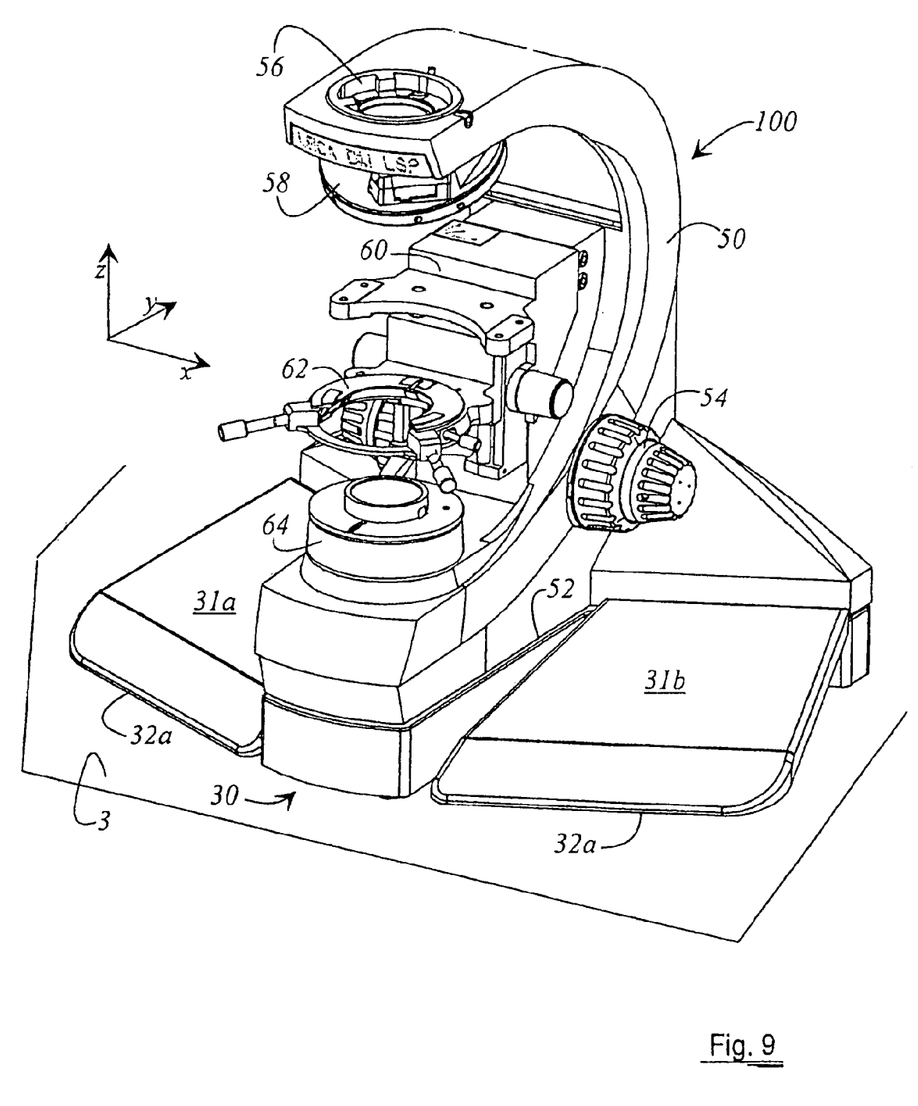
FIG. 9 is a view in perspective of an optical system disposed on the support, the optical system being a microscope.

FIG. 9 shows a support 30 with an optical system represented by a microscope 100 mounted thereon. Parts of microscope 100 that are nonessential for the invention and already constitute prior art have been omitted. Microscope 100 comprises a stand 50 defining a stand bottom 52. Stand bottom 52 rests on base 31 of support 30. As stated in the foregoing description, on the left and right side of base 31 there are provided a left and a right arm rest 31a and 31b. Moreover, on the stand of microscope 100 there is provided a focusing knob 54 whereby the user can adjust the focus position of microscope 100. In the upper part of microscope stand 50 is provided a fastening 56 for an ocular (not shown). Below fastening 56 is provided a fastening 58 for an objective turret (not shown). Also provided on the stand is an adjusting unit 60 for a microscope stage (not shown) whereby the microscope stage can be adjusted in the z-direction. At the lower end of stand 50 is provided a condenser 64 whereby during transmitted light illumination the light can be directed onto a specimen. Above condenser 64 is provided a holding element 62 for filters or the like.

Figure 10:
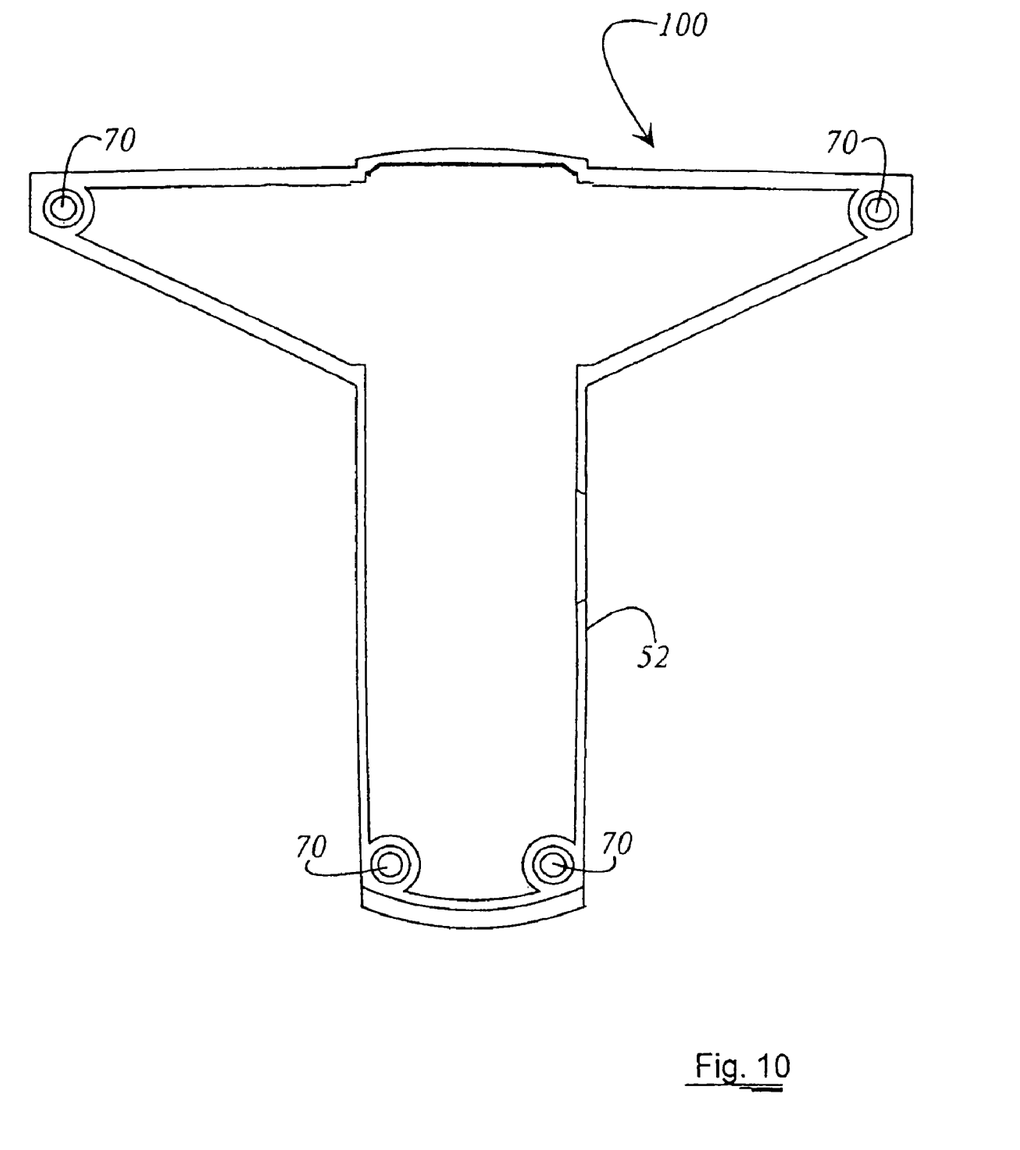
FIG. 10 is a bottom view of the optical system which in this case is a microscope.

FIG. 10 shows a bottom view of the optical system or microscope 100. Naturally, base 31 and the bottom of the optical system or microscope 100 are of the same shape. If this were not so, then for an optical system placed onto base 31, steps or ledges would be formed possibly leading to lesions or unsuitable work positions. In the embodiment shown in FIG. 10, stand bottom 52 is also T-shaped. The T-shape of stand bottom 52 consists of a cross-bar 66 and bar 68 perpendicular thereto. Feet 70 on stand bottom 52 cooperate with hollows 35 on surface 33 of base 31 so that in this manner the optical system or microscope 100 disposed on optical support 30 is automatically aligned on support 30.

The invention was described in relation to a specific embodiment. It is evident, however, that changes and alterations are possible without thereby modifying the scope of the following claims.

I claim:

1. A device (1) for adjusting the height of an arrangement (2) relative to a mounting surface (3), said device being connected with a bottom (5) of the arrangement (2) and comprising:
    at least two mobile elements (7a, 7b) that are telescopically displaceable relative to one another;
    a socket (9) on said bottom (5); and,
    a rotary wheel (8), said rotary wheel (8) including a first thread (8a) and a second thread (8b) having complementary inclinations and surrounding said socket (9) on all sides
    wherein said rotary wheel (8) also surrounds a foot (11), and wherein said socket (9) cooperates with said first thread (8a) and said foot (11) cooperates with said second thread (8b).

2. The height-adjusting device as defined in claim 1, wherein the first thread (8a) is a right-handed thread.

3. The height-adjusting device as defined in claim 2, wherein the second thread (8b) has twice as large an inclination as the first thread (8a).

4. The height-adjusting device as defined in claim 1, wherein the second thread (8b) is a left-handed thread.

5. The height-adjusting device as defined in claim 4, wherein the second thread (8b) has twice as large an inclination as the first thread (8a).

6. The height-adjusting device as defined in claim 1, wherein the socket (9) is pot-shaped, the pot comprising a cover (9a) with a cylindrical wall (9b), said cover (9a) including a pin-shaped holding element (9c) disposed centrally thereon and wherein said cover (9a) is fastened to the bottom (5) of the arrangement (2).

7. The height-adjusting device as defined in claim 6, wherein said pin-shaped holding element (9c) is surrounded by an intermediate sleeve (13) said intermediate sleeve (13) comprising two slits (14) disposed opposite each other.

8. The height-adjusting device as defined in claim 7, wherein said pin-shaped holding element (9c) of the socket (9) includes a slit (16) in which is guided a pin (18) that is firmly connected with the intermediate sleeve (13) whereby the intermediate sleeve (13) is secured against rotation relative to the pin-shaped holding element (9c) of the socket (9).

9. The height-adjusting device as defined in claim 7, wherein a pin (15) engages with each of said slits (14), said pin (15) being firmly connected to the foot (11) so that the foot (11) is secured against rotation relative to the pin-shaped holding element (9c) of socket (9).

10. The height-adjusting device as defined in claim 9, wherein said pin-shaped holding element (9c) of the socket (9) includes a slit (16) in which is guided a pin (18) that is firmly connected with the intermediate sleeve (13) whereby the intermediate sleeve (13) is secured against rotation relative to the pin-shaped holding element (9c) of the socket (9).

11. The height-adjusting device as defined in claim 1, wherein the pin-shaped holding element (9c) includes a displacement stop (20) which with the pin (18) disposed in the intermediate sleeve (13) limits the displacement of the foot (11).

12. The height-adjusting device as defined in claim 1, wherein the rotary wheel (8) includes a toothed element (22) that cooperates with a transmission element (24).

13. The height-adjusting device as defined in claim 1, wherein at least three height-adjusting devices (1) are connected with the bottom (5) of the arrangement (2) 50 that said height-adjusting devices (1) define a plane.

14. The height-adjusting device as defined in claim 13, wherein the three height-adjusting devices (1) form the corner points of an equilateral triangle.

15. A support (30) for an optical system that is provided with at least three height-adjusting devices (1) connected with the bottom (5) of a height adjustment device support (3), said support (30) comprising:
a base (31) with a left and a right hand rest (31a and 31b), wherein left and right hand rest (31a and 31b) are fastened to the base (31) by means of a hinge (32); wherein said base (31) is connected with the bottom (5) of the, and wherein each said height-adjusting device (1) cooperates with a socket (9) surrounded on all sides by a rotary wheel (8), said rotary wheel also surrounds a foot (11), and including a first thread (8a) and a second thread (8b), said first thread and said second thread having complementary inclinations and wherein the socket (9) cooperates with the first thread (8a) and the foot (11) cooperates with the second thread (8b) so as to prevent rotary movement in said foot (11) during said height adjustment.

16. The support (30) for an optical system as defined in claim 15, wherein the first thread (8a) of the height-adjusting device is a right-handed thread.

17. The support (30) for an optical system as defined in claim 16 wherein the second thread (8b) has an inclination twice as large as that of the first thread (8a).

18. The support (30) for an optical system as defined in claim 15, wherein the second thread (8a) of the height-adjusting device is a left-handed thread.

19. The support (30) for an optical system as defined in claim 18, wherein the second thread (8b) has an inclination twice as large as that of there first thread (8a).

20. The support (30) for an optical system as defined in claim 15, wherein the base (31) consists of the bottom (5) and a surrounding wall (34) and that the contour of the bottom (5) corresponds to the contour of the bottom (99) of the optical system.

21. The support (30) for an optical system as defined in claim 20, wherein the surrounding wall (34) is provided with at least three recesses (36) in each of which the rotary wheel (8) engages partly with a surrounding ribbing (38).

22. The support (30) for an optical system as defined in claim 15, wherein the bottom (5) of the base (31) is in the shape of a T formed by a cross-bar (40) and a bar (42) disposed perpendicular to it.

23. The support (30) for an optical system as defined in claim 22, wherein the three height-adjusting devices (1) are disposed at the bottom (5) of the base (31) so that they define an equilateral triangle, with two of said height-adjusting devices (1) being intended for the height adjustment are located in the cross-bar (40) and the third height-adjusting device (1) being intended for the height adjustment of the end (42a) of the bar (42) being disposed opposite the cross-bar (40).

24. The support (30) for an optical system as defined in claim 15, wherein each of at least two rotary wheels (8) is provided with a toothed element (22) that cooperates with a transmission element (24), and said at least two rotary wheels (8) are synchronously displaceable.

25. The support (30) for an optical system as defined in claim 24, wherein all rotary wheels (8) of the height-adjusting device (1) are connected with one another by means of a single transmission element (24).

26. The support for an optical system as defined in claim 25 wherein the optical system is a microscope (100) containing a stand (50) defining a stand bottom (52) and that the microscope (100) is detachably connected to the stand bottom (52) at the base (31) of the support (30).

27. The support (30) for an optical system as defined in claim 25, wherein the base (31) contains a recess (44) for ventilation and that in the base (31) there is provided at least one opening (45) for fastening the microscope (100).

28. The support (30) for an optical system as defined in claim 15 wherein the optical system is a microscope (100) containing a stand (50) defining a stand bottom (52) and that the microscope (100) is detachably connected to the stand bottom (52) at the base (31) of the support (30).

* * * * *